US006907944B2

(12) United States Patent
Sale et al.

(10) Patent No.: US 6,907,944 B2
(45) Date of Patent: Jun. 21, 2005

(54) APPARATUS AND METHOD FOR MINIMIZING WEAR AND WEAR RELATED MEASUREMENT ERROR IN A LOGGING-WHILE-DRILLING TOOL

(75) Inventors: Matthew John Sale, Houston, TX (US); Cornelis Huiszoon, Houston, TX (US); Phillip Lawrence Kurkoski, Houston, TX (US); Volker Krueger, Celle (DE); Harald Grimmer, Lachendorf (DE)

(73) Assignee: Baker Hughes Incorporated, Houston, TX (US)

( * ) Notice: Subject to any disclaimer, the term of this patent is extended or adjusted under 35 U.S.C. 154(b) by 79 days.

(21) Appl. No.: 10/440,994

(22) Filed: May 19, 2003

(65) Prior Publication Data

US 2004/0000401 A1 Jan. 1, 2004

Related U.S. Application Data

(60) Provisional application No. 60/382,800, filed on May 22, 2002.

(51) Int. Cl.$^7$ .......................... E21B 47/00; E21B 49/00; G01V 5/12
(52) U.S. Cl. ............................. 175/57; 175/41; 175/50; 175/325.5; 175/325.1; 166/241.6; 250/269.3; 250/254
(58) Field of Search ................................ 175/323, 325.1, 175/325.5, 50, 57, 41; 250/268, 269.1, 269.3, 254; 166/241.6; 73/152.17; 367/35, 25

(56) References Cited

U.S. PATENT DOCUMENTS 3,202,822 A    8/1965    Kehler
3,321,625 A    5/1967    Wahl
3,846,631 A    11/1974   Kehler
3,858,037 A    12/1974   Moore et al.
3,864,569 A    2/1975    Tittman
4,628,202 A    12/1986   Minette
5,017,778 A *  5/1991    Wraight ...................... 250/254
5,091,644 A    2/1992    Minette
5,134,285 A    7/1992    Perry et al.
5,184,692 A *  2/1993    Moriarty ....................... 175/50
5,351,532 A * 10/1994    Hager ....................... 73/152.55
5,397,893 A    3/1995    Minette
5,877,996 A *  3/1999    Krokstad et al. ............. 367/31
6,179,066 B1 * 1/2001    Nasr et al. ................... 175/45
6,307,199 B1   10/2001   Edwards et al.
6,564,883 B2 * 5/2003    Fredericks et al. ........... 175/50
6,566,649 B1 * 5/2003    Mickael ................... 250/269.3
6,666,285 B2 * 12/2003   Jones et al. ................... 175/50
2002/0057210 A1 * 5/2002 Frey et al. ............... 340/854.3
2004/0251048 A1 * 12/2004 Kurkoski ..................... 175/41

FOREIGN PATENT DOCUMENTS

EP    0505261 A2    9/1992

* cited by examiner

*Primary Examiner*—David Bagnell
*Assistant Examiner*—T. Shane Bomar
(74) *Attorney, Agent, or Firm*—Madan, Mossman & Sriram, P.C.

(57) ABSTRACT

A tool is presented for making density measurements of a formation surrounding a wellbore, comprising a collar housing in a drill string. The housing has at least one first section with a first outer diameter, and at least one sensing section with a second outer diameter located proximate the at least one first section. The second outer diameter is smaller than the first outer diameter. A radioactive source is disposed in the sensing section of the housing. At least two detectors are disposed in the sensing section and spaced from the radioactive source and are positioned to detect radiation resulting from gamma rays emitted by the source.

18 Claims, 5 Drawing Sheets

APPARATUS AND METHOD FOR MINIMIZING WEAR AND WEAR RELATED MEASUREMENT ERROR IN A LOGGING-WHILE-DRILLING TOOL

CROSS-REFERENCE TO RELATED APPLICATIONS

This application claims the benefit of U.S. Provisional Application No. 60/382,800, filed May 22, 2002.

STATEMENT REGARDING FEDERALLY SPONSORED RESEARCH OR DEVELOPMENT

Not applicable

BACKGROUND OF THE INVENTION

1. Field of the Invention

This invention relates to the field of logging-while-drilling (LWD) well boreholes, and more particularly relates to an apparatus and methods for minimizing measurement errors in LWD formation density measurements.

2. Description of the Related Art

The density of formations penetrated by a well borehole is used in many aspects of the petroleum industry. More specifically, formation density is combined with measurements of other formation properties to determine gas saturation, lithology, porosity, the density of hydrocarbons within the formation pore space, properties of shaly sands, and other parameters of interest.

Methods and apparatus for determining formation density, comprising an isotopic gamma ray source and two gamma ray detectors are known in the art and are often referred to as dual spaced density logs or gamma-gamma density logs. For examples of wireline tools incorporating the technique see U.S. Pat. Nos. 3,202,822, 3,321,625, 3,846,631 3,858,037, 3,864,569 and 4,628,202. The wireline apparatus is normally configured as a logging tool (sonde) for conveying, preferably with a multiconductor cable, along a borehole thereby "logging" formation density as a function of depth. The source and two detectors are typically mounted in an articulating pad device with a backup arm. The backup arm applies force to the articulating pad to maximize pad contact with the wall of the borehole. The sonde responds primarily to radiation which is emitted by the source and scattered by the formation into the detectors. The scatter reaction is primarily Compton scattering, and the number of Compton scattering collisions within the formation can be related to electron density of materials within the formation. Through sonde calibration means, a measure of electron density of the formation can be related to true bulk density of the formation.

Since the dual spaced density measurement technique is based upon a nuclear process, statistical error is associated with the measurement. There is also non-statistical error in the measurement. Although the articulating pad and backup arm tend to position the pad against the borehole wall, the largest source of non-statistical error is generally still associated with the position of the tool within the well borehole, and is generally referred to as standoff error. As used herein, standoff refers to the distance from the outer surface of the sensing section of the tool to the wall of the borehole. The responses of the two detectors are combined in prior art dual spaced density systems using well known algorithms to minimize standoff error.

The dual spaced density systems are available as an LWD system. As in the wireline version of the system, the dominant non-statistical error that arises in LWD formation density measurements results from tool standoff. In prior art LWD systems, see FIG. 1, the source 201 and two detectors 202,203 are mounted in-line on an axial blade 208 having a substantially bit gauge diameter such that the source 201 and detectors 202,203 and their associated windows 204–206 are in close proximity to the wall 207 of the borehole. For example see U.S. Pat. No. 5,091,644. As the blade wears during drilling, the collimating windows typically associated with such tools also wear thereby changing the response of the tool. There is no known technique that measures and corrects for this tool wear in real time. These errors must be calibrated out in a lab environment. Today's drilling technology uses high rotational velocities, drills in-gauge hole, and permits very long, continuous drilling periods. Tool wear can no longer be practically calibrated out in the lab, because measurement errors due to wear become excessive during long drilling runs.

The methods and apparatus of the present invention overcome the foregoing disadvantages of the prior art by positioning the source and detector in a tool section substantially protected from such wear.

SUMMARY OF THE INVENTION

The present invention contemplates a density tool having appropriately located source and detectors to minimize the wear-related error in the density measurement.

In one preferred embodiment, a tool is presented for making density measurements of a formation surrounding a wellbore, comprising a collar housing conveyed on a drilling tubular. The housing has at least one first section with a first outer diameter, and at least one sensing section with a second outer diameter located proximate the at least one first section. The second outer diameter is smaller than the first outer diameter. A radioactive source is disposed in the sensing section of the housing. At least two detectors are disposed in the sensing section and spaced from the radioactive source and are positioned to detect radiation resulting from gamma rays emitted by the source.

In one aspect of the present invention, a method of minimizing wear related measurement error in a logging-while-drilling density tool in a wellbore, comprises providing a tool having at least one wear-resistant section having a first outer diameter proximate a sensing section with a second outer diameter smaller than the first outer diameter; and taking measurements during drilling with a radioactive source and at least two detectors mounted in the smaller diameter sensing section.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
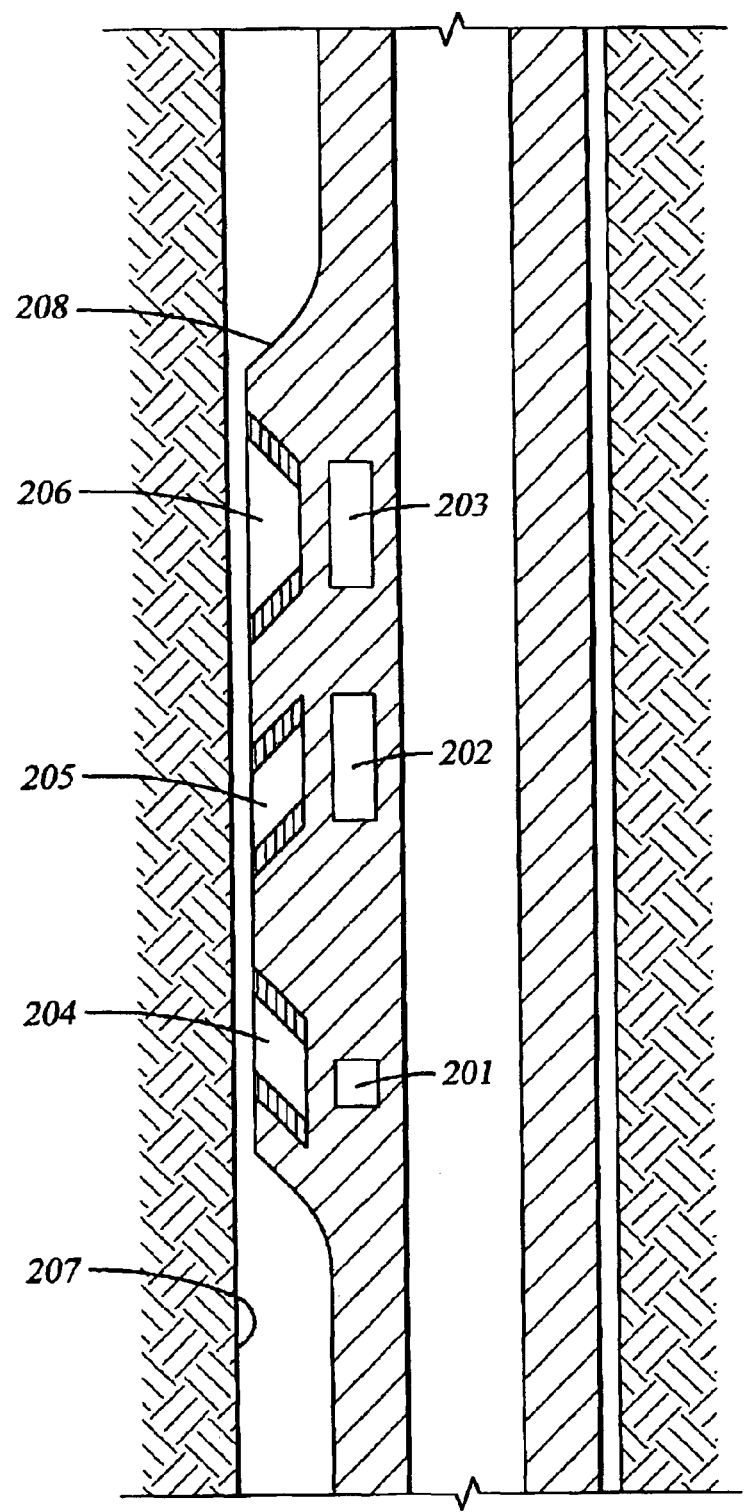
FIG. 1 is a schematic of a prior art density tool.
Figure 2:
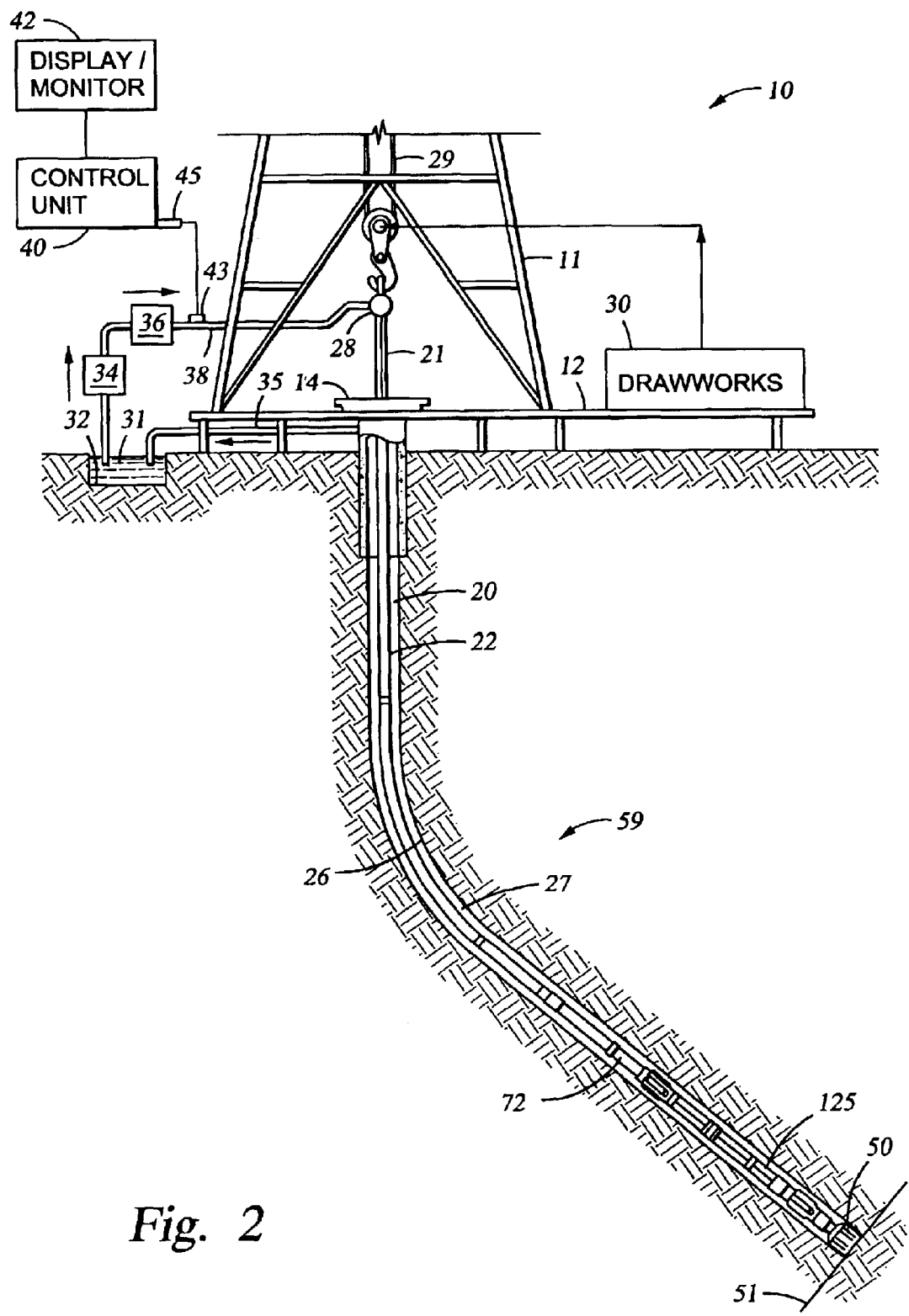
FIG. 2 is a schematic of a drilling system according to one embodiment of the present invention.

FIG. 2 shows a schematic diagram of a drilling system 10 having a downhole assembly containing a downhole sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a wellbore 26. A drill bit 50 attached to the drill string downhole end disintegrates the geological formations when it is rotated. The drill string 20 is coupled to a drawworks 30 via a kelly joint 21, swivel 28 and line 29 through a system of pulleys (not shown). During the drilling operations, the drawworks 30 is operated to control the weight on bit and the rate of penetration of the drill string 20 into the wellbore 26. The operation of the drawworks is well known in the art and is thus not described in detail herein. Alternatively, a coiled tubing system (not shown), as is known in the art, may be used to convey tools in the wellbore.

During drilling operations, a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the wellbore bottom 51 through an opening in the drill bit 50. The drilling fluid circulates uphole through the annular space 27 between the drill string 20 and the wellbore 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

In the preferred embodiment of the system of present invention, the downhole subassembly 59 (also referred to as the bottomhole assembly or "BHA"), which contains the various sensors and MWD devices to provide information about the formation and downhole drilling parameters, is coupled between the drill bit 50 and the drill pipe 22. The downhole assembly 59 is modular in construction, in that the various devices are interconnected sections.

Referring to FIG. 2, the BHA 59 also preferably contains downhole sensors and devices in addition to the above-described surface sensors to measure downhole parameters of interest. Such devices include, but are not limited to, a device for measuring the formation resistivity near the drill bit, a gamma ray device for measuring the formation natural gamma ray emission intensity, devices for determining the inclination and azimuth of the drill string, and a nuclear device 125 for measuring formation density.

The above-noted devices transmit data to the downhole telemetry system 72, which in turn transmits the sensor data uphole to the surface control unit 40. The present invention preferably utilizes a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this invention.

Figure 3:
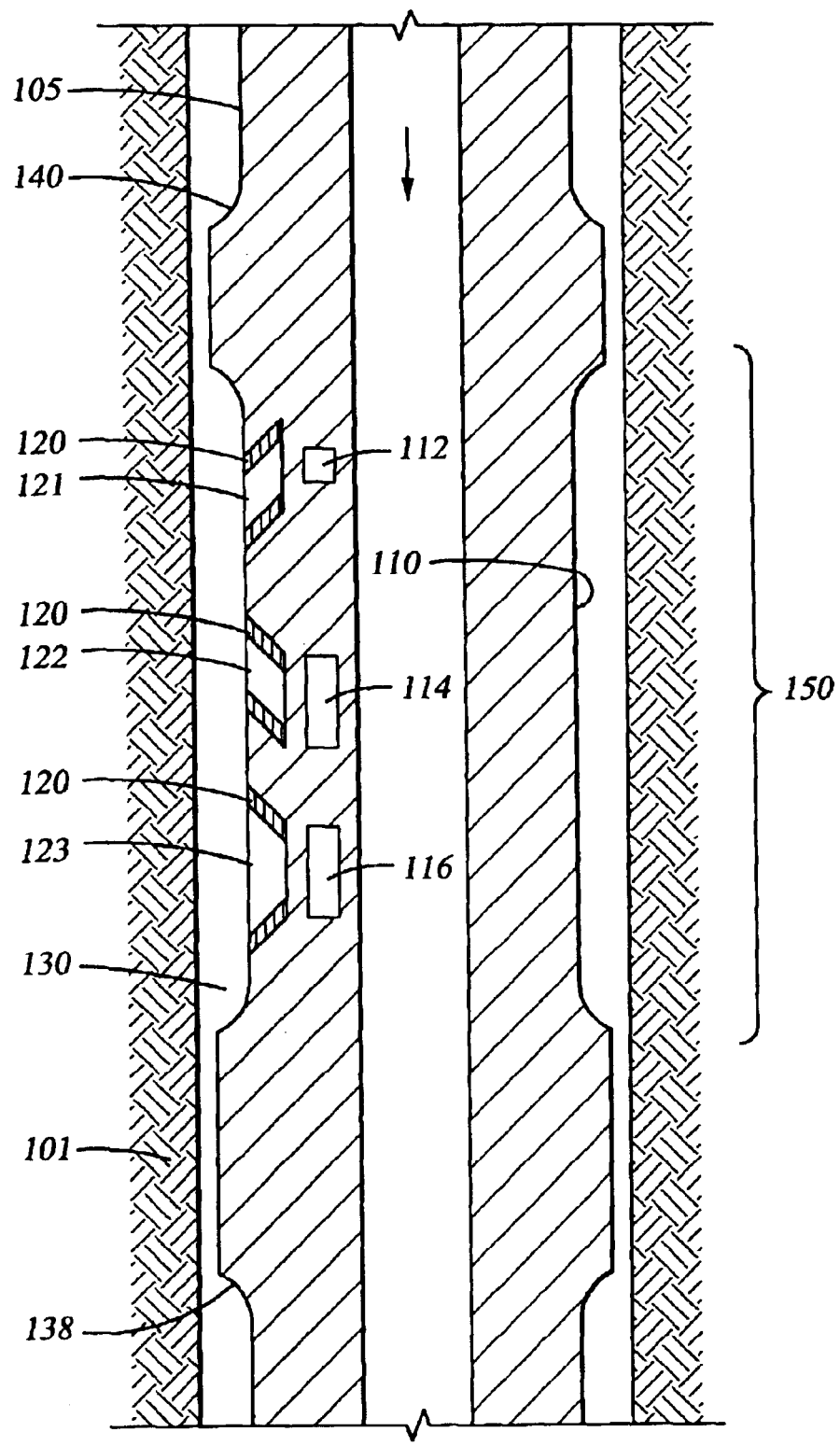
FIG. 3 is a schematic of a density tool according to one embodiment of the present invention.

Referring first to FIG. 3, a diagram of the basic components for a gamma-ray density tool 110 in accordance with a preferred embodiment of the present invention is shown. The tool 110 comprises a drill collar housing 105 which contains a gamma-ray source 112 and two spaced gamma-ray detector assemblies 114 and 116. All three components are placed substantially in-line along a single axis that has been located parallel to the axis of the tool. The detector 114 closest to the gamma-ray source will be referred to as the "short space detector" and the one farthest away 116 is referred to as the "long space detector". The two gamma ray detector assemblies employ a sodium iodide crystal and glass phototube. Gamma-ray shielding is located between detector assemblies 14, 16 and source 12. Windows 121, 122, 123 open up to the formation from both the detector assemblies and the source. The windows 121–123 have shielding material 120, such as tungsten, to collimate the radiation as it passes through the windows.

Stabilizer 138 is attached to the collar housing 105 on one side of sensing section 150. Stabilizer 138 has a larger diameter than that of sensing section 150 and provides a contact wear surface against the wall of wellbore 26. The diameter of stabilizer 138 may be from approximately ¹⁄₁₆" to approximately ½" larger than the diameter of sensing section 150. The stabilizer has multiple blades, common in the art, arranged for allowing mud to pass upwards in the annulus. The blades may be straight in the axial direction, or, alternatively, they may spiral around the diameter of the collar housing. The blades are surfaced with an enhanced wear-resistant material such as tungsten carbide or any other suitable wear-resistant material. A wear pad 140 of wear resistant material is placed on the other side of the sensing section 150 away from stabilizer 138 and also is larger in diameter than sensing section 150. The combination of larger diameters on stabilizer 138 and wear pad 140 act to substantially prevent contact between sensing section 150 and formation 101. This prevents wear of the source and detector windows and shielding and substantially eliminates errors caused by these factors. As a result, a layer of drilling fluid (mud) is present in the standoff region between the formation and the detector assemblies and source.

The tool 110 is placed into service by loading it with a sealed chemical source (typically cesium 137) and lowering it into a formation. Gamma-rays are continuously emitted by the source and these propagate out into the formation 101.

Two physical processes dominate the scattering and absorption of gamma rays at the energies used in density tools. They are Compton scattering and photoelectric absorption. The macroscopic Compton scattering cross section (i.e., probability of scattering while passing through a set thickness of material) is proportional to the electron density in the formation and is weakly dependent on the energy of the incident gamma ray (it falls fairly slowly with increasing energy). Since the electron density is, for most formations, approximately proportional to the bulk density, the Compton cross section is proportional to the density of the formation. Unlike the Compton cross section, the photoelectric cross section is strongly dependent on the energy of the incident gamma rays and on the materials in the formation (the lithology).

Formation density is determined by measuring the attenuation of gamma rays through the formation. Shielding in the tool minimizes the flux of gamma rays straight through the tool. This flux can be viewed as background noise for the formation signal. The windows 121–123 increase the number of gamma rays going from the source to the formation and from the formation to the detectors. The layer of mud 130 between the sensing section 150 diameter and the formation is compensated for by using a "rib" algorithm, known in the art.

The compensation for the mud standoff 130 is usually accomplished through the use of two detectors: a short space and a long space detector. Since gamma rays travel through more of the formation to reach the long space detector than they do to reach the short space detector, the long space detector shows a significantly larger count rate change for a given change in formation density. This allows for the compensation using the two detector responses and a "rib" algorithm known in the art. The rib function, allows for the calculation of compensation (which should be equal to the difference between the true and the measured long space density), as a function of the difference between the short and long space densities. Any wear on the source and detector windows or any reduction in shielding thickness due to wear causes additional error that can not be accounted for by the known techniques.

Figure 4:
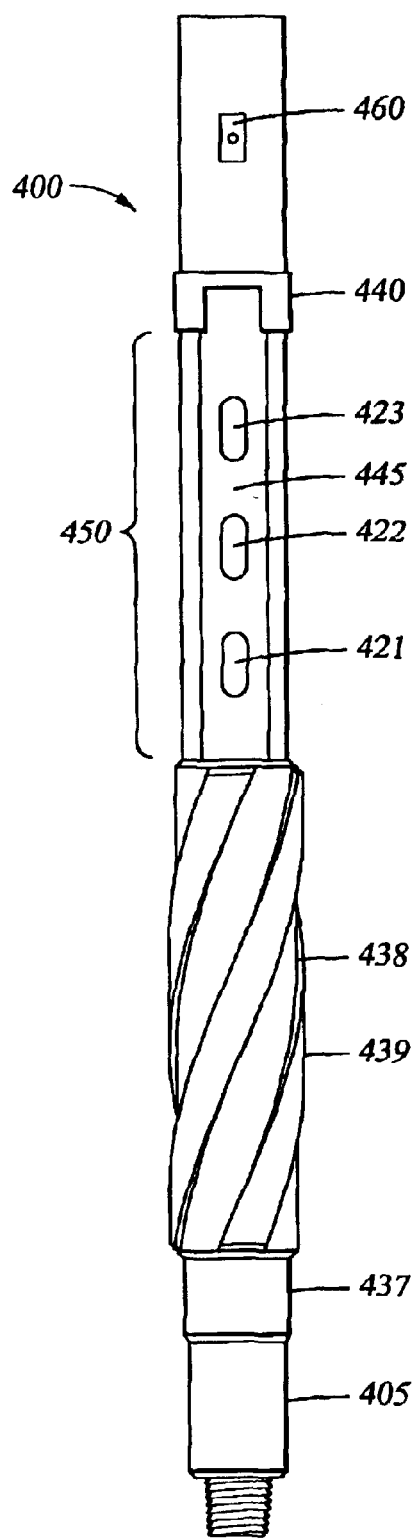
FIG. 4 is a schematic of a density tool according to another preferred embodiment of the present invention.

In one preferred embodiment, see FIG. 4, a formation density comprises a collar housing 405 having a stabilizer 438 with multiple blades 439 mounted on one end of an sensing section 450 where the outer diameter of the stabilizer blades 439 are larger than the diameter of the sensing section 450 by the same range as mentioned previously. The stabilizer 438 is locked onto the housing 405 by lock nut 437. Alternatively, the stabilizer may be integrally machined on the housing, a press-fit sleeve, a shrink-fit sleeve, or a sleeve welded on the housing 405 using techniques common in the art. A wear pad 440 is located at a distal end of sensing section 450. The stabilizer 438 and the wear pad 440 act to prevent contact with a wall of a borehole (not shown) to prevent wear on cover 445. A cavity (not shown) is formed in housing 405 for mounting the source and detectors previously described. Cover 445 covers and sealed the source and detectors and contains source window 421, short-space detector window 422, and long-space detector window 423 along with suitable collimating shielding as previously described. An acoustic sensor 460 is mounted substantially in-line with the gamma source and detectors and measures the distance to the borehole wall. The distance measurement provides an indication of the standoff distance from the cover 445 to the borehole wall for use in standoff compensation. Suitable circuitry, power and processing capability, common in the art, are contained in the tool 400 for processing the gamma density detection measurements. A processor (not shown) acts according to programmed instructions downloaded in the tool to make the proper corrections.

Figure 5:
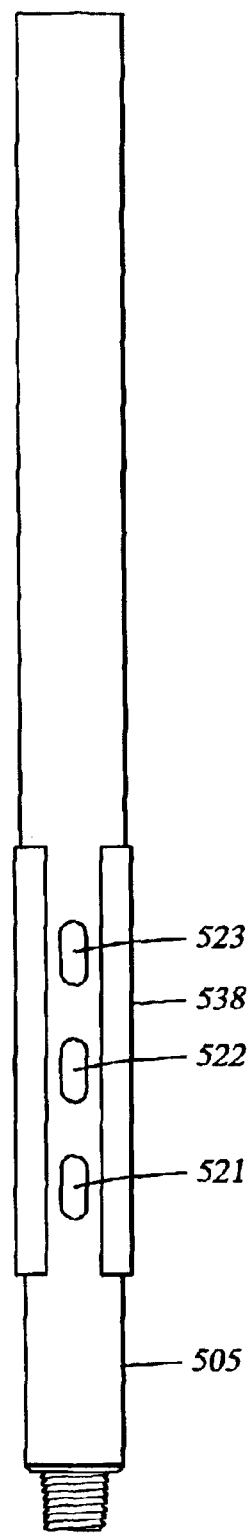
FIG. 5 is a schematic of a density tool according to another preferred embodiment of the present invention.

In another preferred embodiment, see FIG. 5, a gamma source and sensors (not shown) having sensor windows 521–523 are located between stabilizer blades 538. The blades 538 have an outer diameter larger than the sensing section diameter 505 by the previously described range. Locating the sensors between the blades 538 provides protection from wear on the sensor section and the extra advantage of reducing tool length.

Figure 6:
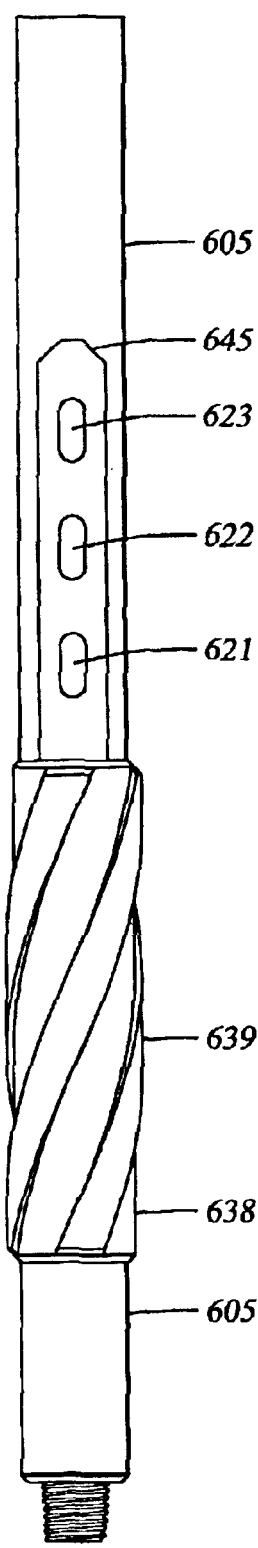
FIG. 6 is a schematic of a density tool according to another preferred embodiment of the present invention.

In yet another preferred embodiment, see FIG. 6, a gamma source and sensors (not shown) having sensor windows 621–623 are mounted proximate a stabilizer 638 having blades 639. The blades 639 have an outer diameter larger than the sensing diameter section 605 by the previously described range. The location of the sensors near the stabilizer provides protection for the sensor section.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. A tool for making density measurements of a formation surrounding a wellbore, comprising:
   a. a drill collar housing conveyed on a drilling tubular, said drill collar housing having a first section with a first outer diameter, and a sensing section with a second outer diameter proximate to and axially spaced from said first section, where said second outer diameter is smaller than said first outer diameter;
   b. a radioactive source disposed in a wall said sensing section of said drill collar housing; and
   c. at least two detectors at least partially disposed in the wall of said sensing section spaced from said radioactive source and positioned to detect radiation resulting from gamma rays emitted by said source.

2. The tool of claim 1, wherein the difference between said first outer diameter and said second outer diameter is between approximately 1/16" to approximately 1/2".

3. The tool of claim 1, wherein the drilling tubular is one of (i) a drillstring and (ii) a coiled tubing.

4. The apparatus of claim 1, wherein the at least one first section is a stabilizer.

5. The tool of claim 4, wherein the at least one stabilizer is at least one of (i) a sleeve adapted to slide on to said collar housing and be captured by a lock nut; (ii) a shrink fit stabilizer; (iii) a press fit stabilizer; and (iv) a stabilizer integrally formed into the housing.

6. The tool of claim 4, wherein the stabilizer comprises at least two substantially axially aligned blades integrally formed into the housing, said radioactive source and said at least two detectors mounted between two of said at least two blades.

7. The apparatus of claim 4, wherein the stabilizer comprises a blade having a wear resistant material disposed on an outer surface of the blade.

8. The apparatus of claim 1, further comprising a wear band spaced apart from said at least one first section.

9. A method of reducing wear related error in a logging-while-drilling density tool in a wellbore, comprising:

a. providing a tool having a drill collar housing wherein the drill collar housing comprises at least one wear-resistant section having a first outer diameter proximate to and axially spaced from a sensing section with a second outer diameter smaller than said first outer diameter; and b. taking measurements during drilling with a radioactive source and at least two detectors at least partially disposed in a wall of said sensing section.

10. The method of claim 9, further comprising making an acoustic measurement of distance from a wall of the wellbore to an outer surface of the tool.

11. The method of claim 10, further comprising combining said acoustic tool distance measurement and said at least two detector measurements to generate a compensated formation density measurement.

12. The method of claim 9, wherein the difference between said first outer diameter and said second outer diameter is between approximately $1/16$" to approximately $1/2$".

13. The method of claim 9, further comprising conveying said density tool into said wellbore on at least one of (i) a drillstring and (ii) a coiled tubing.

14. The method of claim 9, wherein the at least one first section is a stabilizer.

15. The method of claim 14, wherein the at least one stabilizer is at least one of (i) a sleeve adapted to slide on to said collar housing and be captured by a lock nut; (ii) a shrink fit stabilizer; (iii) a press fit stabilizer; and (iv) a stabilizer integrally formed into the housing.

16. The method of claim 14, wherein the stabilizer comprises at least two substantially axially aligned blades integrally formed into the housing, said radioactive source and said at least two detectors mounted between two of said at least two blades.

17. The method of claim 14, wherein the stabilizer comprises a blade having a wear resistant material disposed on an outer surface of the blade.

18. The method of claim 9, further comprising providing a wear band spaced apart from said at least one first section.

* * * * *